United States Patent [19]

Close

[11] 4,231,591
[45] Nov. 4, 1980

[54] AUTOMATIC RETRACTOR INHIBITOR

[75] Inventor: Albert R. Close, Newhall, Calif.

[73] Assignee: American Safety Equipment Corporation, San Fernando, Calif.

[21] Appl. No.: 878,730

[22] Filed: Feb. 17, 1978

[51] Int. Cl.² .......................................... B65H 75/48
[52] U.S. Cl. ............................. 280/806; 242/107.4 A
[58] Field of Search ............... 280/745, 744, 747, 806; 242/107.4 A

[56] References Cited

U.S. PATENT DOCUMENTS

| | | | |
|---|---|---|---|
| 3,897,913 | 8/1975 | Hall | 242/107.4 A |
| 3,926,384 | 12/1975 | Weman | 242/107.4 A |
| 3,945,587 | 3/1976 | Willey et al. | 242/107.4 A |
| 4,007,802 | 2/1977 | Rosa | 280/744 X |
| 4,084,840 | 4/1978 | Buff et al. | 242/107.4 A X |
| 4,085,905 | 4/1978 | Lindbald | 242/107.4 A |
| 4,093,145 | 6/1978 | Klink | 242/107.4 A |

Primary Examiner—John J. Love
Assistant Examiner—Norman L. Stack
Attorney, Agent, or Firm—Poms, Smith, Lande & Rose

[57] ABSTRACT

A safety belt retractor is disclosed of the type adapted for mounting in the door of a vehicle and operated by movement of a high inertia mass to lock up only under the influence of high lateral forces such as imposed in an emergency condition. During periods of door opening a superceding fulcrum point about which the high inertia member must rotate to lock up the retractor is imposed whereby undesired lock-up of the retractor during rapid opening of the vehicle door is virtually eliminated. The inhibiting action is directly tied to the door locking mechanism whereby almost instantaneous inhibition is applied upon opening of the vehicle door.

12 Claims, 4 Drawing Figures

U.S. Patent Nov. 4, 1980 4,231,591
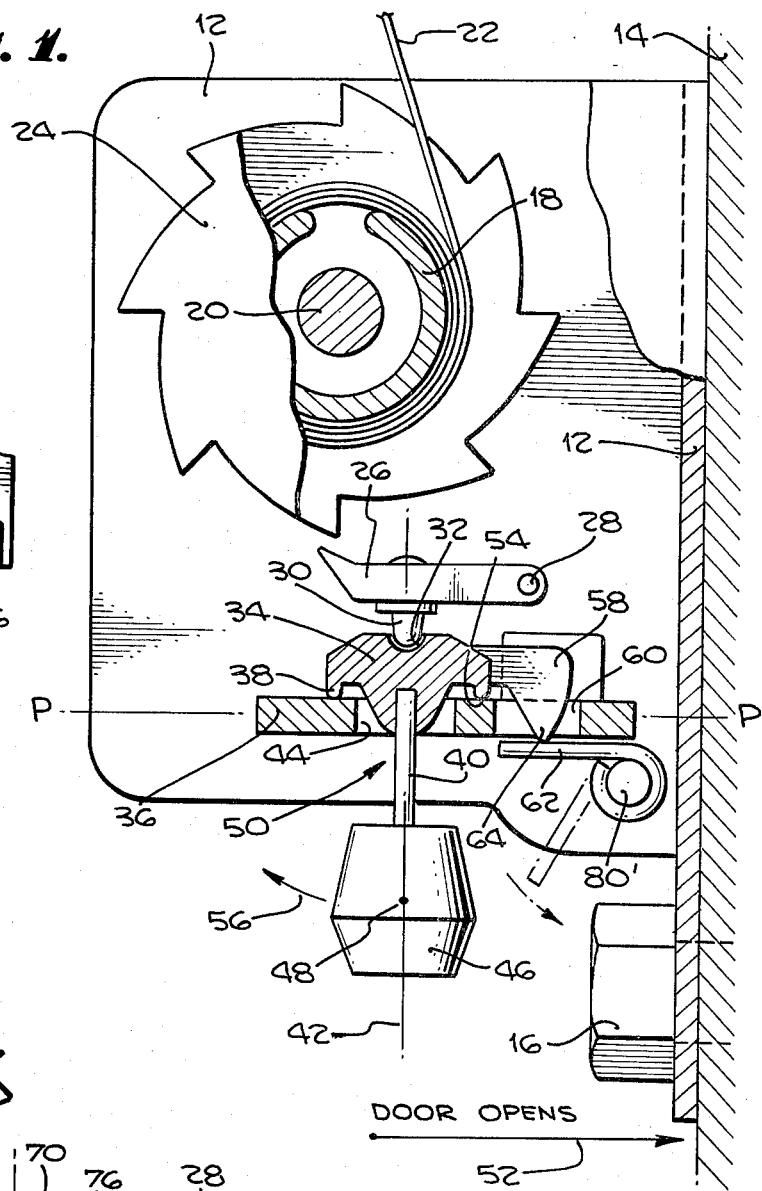
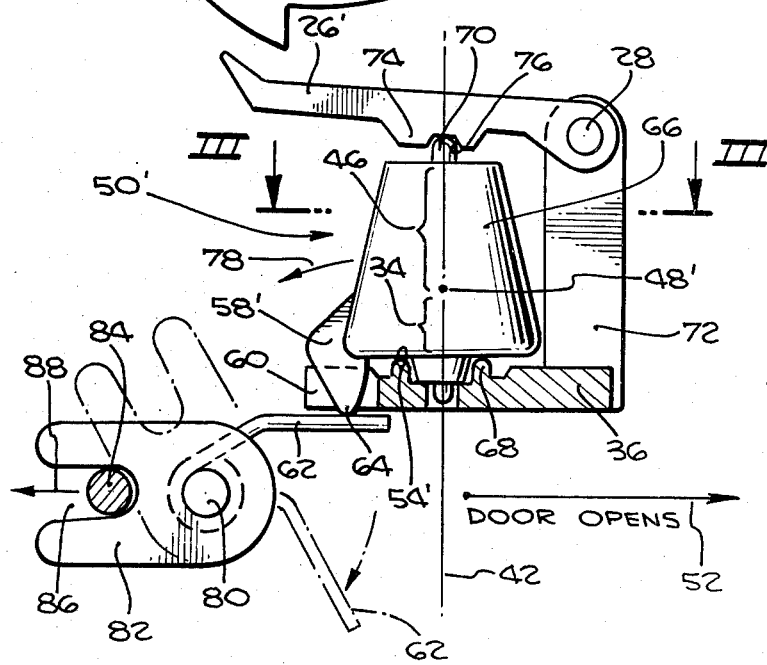
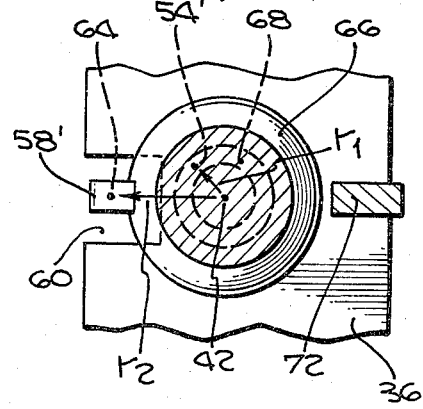

AUTOMATIC RETRACTOR INHIBITOR

BACKGROUND OF THE INVENTION

The present invention relates to safety belt retractors and more particularly to inertially operated safety belt retractors adapted for mounting inside a vehicle door.

In the copending application of William M. Hollowell and Avraham Ziv entitled "VEHICLE SENSING INERTIA REEL LOCKUP INHIBITOR," Ser. No. 872,306, filed Jan. 25, 1978, and assigned to the common assignee of this application, an in-depth discussion is made of various vehicular safety belt systems and one technique for inhibiting, but not preventing, lock-up during the opening of the vehicle door of an inertially operated safety belt retractor of the type mounted within the door of the vehicle to provide upper torso restraint. According to the teaching of said application, an external biasing force is applied to the high inertia mass contained within the retractor activation mechanism during the door opening operation in order to make the high inertia mass more resistive to moving from the unlocked to the locked position during door opening operations. Several embodiments for accomplishing this are shown therein. A separate sensor (mechanical or electrical) is employed according to the teaching of said application to apply and remove the biasing force to the high inertia mass.

While the apparatus of said copending application works well for its intended purposes in many applications, there are some instances where space, monitary, and time/space lag considerations attendant the design of the retractor itself and/or the vehicle in which it is mounted dictate that a simpler, less costly, and/or faster operating inhibition mechanism be employed.

Wherefore, it is the object of the present invention to provide an inhibitor for inertially operated safety belt retractors which is automatically and virtually instantaneously applied during door opening operation of the vehicle.

SUMMARY

The foregoing objectives have been met in inertially operated safety belt retractors including a ratcheted spool rotatably journaled in a retractor frame, a safety belt wound on the spool, a movable pawl for engaging the spool to prevent protraction of the safety belt, an activating member supported for rotation on a supporting boundary on a base carried by the retractor frame and adapted to move the pawl into engagement with the spool when rotated, and a high inertia mass carried by said tipable member for rotating said activating member only in response to a lateral force exceeding a preselected level, by the improvement for raising the lateral force in a particular radial direction required to rotate the activating member comprising a support member disposed to support the activating member for rotation at a point beyond the first supporting boundary on a radial line extending through the center of gravity of the mass and the point on the first supporting boundary on which the activating member would normally rotate in response to the application of such force. More particularly as applied to such inertially operated safety belt retractors adapted for mounting in a vehicular door which door has a movable locking member for engaging a mating member on the door frame for holding the door in a closed and locked position, wherein the retractor includes a ratcheted spool rotatably journaled in a retractor frame, a safety belt wound on the spool, a movable pawl for engaging the spool to prevent protraction of the safety belt, and a high inertia mass contacting the pawl and pivoting about a first fulcrum point to move the pawl into engagement with the spool during periods of high lateral force on the mass as imposed in emergency conditions, the present improvement for resisting the non-emergency engaging of the spool by the pawl during normal opening of the vehicle door comprises means for sensing that the vehicle door is being opened; and, means cooperating with the sensing means for disposing a superceding fulcrum point on which the mass must rotate to move the pawl into engagement with the spool at a greater horizontal radial distance from the center of gravity of the mass than the first fulcrum point while the door is being opened. To obtain the rapid inhibition objective, the sensing means in the preferred embodiment is operably connected to the movable locking member of door whereby the superceding fulcrum point is actively disposed to inhibit, but not prevent, the rotating of the high inertia mass whenever the door is unlocked.

DESCRIPTION OF THE DRAWINGS

FIG. 1 is a partially cut-away side elevation of an inertially operated seat belt retractor of a first type having an appropriate embodiment of the present invention attached thereto.

FIG. 2 is a partially cut-away elevation of the inertial reactor of a second type inertially activated safety belt retractor having an appropriate embodiment of the present invention attached thereto.

FIG. 3 is a cut-away plan view of the apparatus of FIG. 2 in the plane III—III.

FIG. 4 is an alternate embodiment of the present invention as applicable to inertially operated safety belt retractors of the type shown in FIG. 2.

DESCRIPTION OF THE PREFERRED EMBODIMENT

Referring first to FIG. 1, a first type of inertially operated safety belt retractor is shown generally indicated as 10. Retractor 10 comprises a generally U-shaped retractor frame 12 adapted for mounting inside of the door 14 of a vehicle as with one or more bolts 16. A spool 18 is rotatably journaled to the retractor frame 12 by a shaft 20. A safety belt 22 is wound on spool 18 between a pair of toothed or ratcheted rims 24 carried by spool 18 in spaced relationship. A pawl 26 is rotatably attached to the frame 12 with a pivot 28. An operating member 30 is carried by pawl 26 to ride in a depression 32 of a disc-shaped activating member 34 supported on a base 36 carried by frame 12. As indicated, base 36 is typically disposed to be in a horizontal plane such as indicated by the line P—P. Depression 32 is disposed substantially in the top center of activating member 34 such that the peripheral edge 38 of activating member 34 is disposed concentrically about depression 32 since, as mentioned, activating member 34 is disc-shaped. A shaft 40 is mounted to activating member 34 along a vertical line 42 passing through depression 32. Shaft 40 passes through a hole 44 in base 36 concentrically disposed about shaft 40 and of sufficient diameter such that shaft 40 can move radially in any direction to cause activating member 34 to rotate in any direction on peripheral edge 38 as a fulcrum point to raise depression 32 and operating member 30 therewith and, thereby, raise pawl 26 into engagement with toothed rim 24. A high inertia mass 46 is disposed on the opposite end of shaft 40 in the manner of a pendulum. The center of gravity of mass 46, indicated as 48, is disposed to lie along vertical line 42 whereby, since base 36 is horizontal as mentioned, activating member 34 is subjected to a force tending to hold member 34 against base 36 to resist rotating on peripheral edge 38 equally in any direction.

With nothing more than the basic inertial operating system generally indicated as 50 heretofore described, if door 14 were suddenly opened in the direction as indicated by the arrow 52, high inertia mass 46 would resist movement (due to the inertia thereof) causing activating member 34 to be rotated on the peripheral edge 38 about a first fulcrum point 54 as indicated by the arrow 56. As can be seen then, the undesired locking force tending to lock-up retractor 10 to prevent protraction of belt 22 during the door opening operation is effectively a force along a line normal to the door passing through vertical line 42 in a direction opposite arrow 52. That is, the effective force against mass 46 upon opening the door to the right as seen when viewing FIG. 1 is a force extending from right to left. It is, therefore, only this uni-directional force which must be inhibited during the door opening operation to prevent undesired lock-up of retractor 10.

To accomplish this single direction inhibition according to the present invention, as applied to the pendulum type inertial operating system 50 shown in FIG. 1, a support member 58 is attached to activating member 34 extending radially along a line passing through vertical line 42 extending in the direction from which the force to be inhibited will come. Thus, in the drawing of FIG. 1, support member 58 is disposed to project radially to the right. A second hole 60 is disposed through base 36 to provide a passageway for the movement of support member 58 when inhibition of the movement of activating member 34 is not desired (i.e. when the door is closed). That is, if activating member 34 is rotated on the first fulcrum point 54 by mass 46 rotating clockwise in the direction of arrow 56, support member 58 can pass through hole 60. A rotatable member 62 is provided which is rotatable between the full-line position and the ghosted position of FIG. 1. As can be seen, in its raised (or most clockwise) position, rotatable member 62 is adapted to block hole 60 and intercept support member 58 as activating member 34 attempts to rotate on the first fulcrum point 54 (as in response to the door being opened suddenly in the direction of arrow 52). With rotatable member 62 raised, support member 58 contacts rotatable member 62 thus forming a second fulcrum point 64 radially disposed from the center of gravity 48 of mass 46 a greater horizontal distance than first fulcrum point 54. Since the same mass (high inertia mass 46) must now attempt to rotate on a longer moment arm (the horizontal radial distance between vertical line 42 passing through the center of gravity 48 and second fulcrum point 64), a greater force is necessary to cause such rotation. This, of course, is the desired result in order to resist undesired lock-up of the retractor 10 during the rapid opening of door 14.

The radial distance from vertical line 42 to second fulcrum point 64 is chosen such as to raise the force necessary for lock-up above the normal force imposed upon the mass 46 during door opening but below that which would be encountered by an emergency condition such as the vehicle being struck while the door is being opened. Thus, the retractor 10 is inhibited within safe limits and never "locked out" to still protect in the event of an accident with the door ajar.

Referring now to FIGS. 2 and 3, a second type of inertial operating system generally indicated as 50' is shown incorporating the present invention. In this embodiment, the activating member 34 and high inertia mass 46 of FIG. 1 are combined into a high inertia activating member 66 having the bottom thereof forming the equivalent of disc-shaped activating member 34 and the top thereof the mass equivalent of high inertia mass 46. High inertia activating member 66 rests on and is supported by a circular ridge 68 on the base 36 concentrically disposed about vertical line 42 which, as with the embodiment of FIG. 1, passes through the center of gravity 48' of member 66. Circular ridge 68 provides a supporting boundary on which activating member 66 can rotate. An activating projection 70 extends vertically from the member 66 along line 42. The operation of projection 70 will be discussed shortly. A pawl 26' is disposed to rotate about pivot 28 to lockingly engage toothed rim 24. Contrary to the mounting of pawl 26 of FIG. 1, pivot 28 rotatably holding pawl 26' is supported by a support member 72 connected to base 36 rather than being attached to frame 12. This is a matter of choice only, and is shown as being representative of various modes of construction for inertially operated retractors as wherein the present invention can be readily applied. Pawl 26' has a raised actuating area 74 disposed adjacent projection 70. Actuating area 74 has a depression 76 with angled sidewalls into which projection 76 is inserted. The method of operation of the inertial operating system 50' of FIG. 2 and 3 can best be understood by following the reaction as the door is opened as previously described with relation to the apparatus of FIG. 1. Once again, the door is opened in the direction of the arrow 52. As the door is opened to the right, a corresponding force tends to rotate high inertia activating member 66 counter-clockwise on a first fulcrum point 54' (of radius $r_1$ from center line 42) as member 66 rotates on the supporting boundary (i.e. circular ridge 58) in the direction of arrow 78. As can be seen, as member 66 rotates in the direction of arrow 78, projection 70 pushing against the sidewalls of depression 76 of actuating area 74 raises pawl 26' into locking engagement with toothed rim 24.

To effect the objectives of the present invention in this embodiment, a support member 58' is attached to activating member 66 extending radially in the direction along which the force to be opposed acts and extending beyond the first fulcrum point 54'. Also in like manner, a hole 60 is provided in base 36 as a passageway for the movement of support member 58' during unimpeded operation of the inertial operating system 50'. A rotatable member 62 is again provided in this embodiment for selectively contacting support member 58 to create a second fulcrum point 64 (of radius $r_2$ being greater than $r_1$) on which member 66 must rotate (only under the influence of greater force than normal) to lock the retractor during door opening operations.

FIG. 2 also indicates the specific preferred method for rotating rotatable member 62 (in either embodiment) to effect the objectives of the present invention. As can be seen in FIG. 2, rotatable member 62 is carried by a shaft 80 carrying a locking member 82 which is adapted to engage a corresponding locking member 84 disposed on the door frame of the vehicle. Thus, shaft 80 senses when the door is being opened as it must rotate to allow the door to open. In typical automobile door locking mechanisms, locking member 82 is U-shaped to provide a slot 86 through which the other member 84 can slide in the direction of arrow 88 as the door is opened in the direction of arrow 52. Upon closing the door, locking member 82 engages member 84 by having member 84 enter slot 86 (in the direction opposite arrow 88) to the bottom thereof whereupon continued closing of the door causes locking member 82 to be rotated such as to the ghosted position where it is held until released to firmly grip member 84 and, thereby, hold the door in a closed position. Upon release, locking member 82 must rotate counter-clockwise from the ghosted position to the normal position of FIG. 2 before the door can move to open. Thus, rotatable member 62 connected to shaft 80 to rotate therewith is rotated into position to impede the rotating of member 66 almost instantaneously with the disengaging of the locking mechanism which allows the opening of the door. Thus, while not specifically shown, it is preferred that shaft 80' of FIG. 1 carrying rotatable member 62 thereof be similarly associated to move in combination with the locking member 82 of the door thereof to thereby respond in instantaneous manner. Electrical sensing of the door opening and movement of rotatable member 62 in a manner similar to the apparatus of the above-described copending application could, of course, also be used but is not preferred.

Referring now to FIG. 4, an alternate embodiment of the present invention is shown which is applicable to an inertial operation system employing a high inertia activating member 66 such as 50' in FIG. 2. In the embodiment of FIG. 4, rotatable member 62' is provided with a projection 90 which acts as the support member. Whereas in the two previous embodiments, the support member 58 was carried by the activating member, and support therefore (in the form of rotatable member 62) was applied and removed to create the second fulcrum point 64, in the present embodiment, both the support member and the support therefore (in the form of rotatable member 62' and projection 90) are rotated into and out of contact with the high inertia activating member 66 adjacent the periphery thereof. The advantage of such an approach is that no modification need be made to high inertia activating member 66. The only addition necessary is the mounting of rotatable member 62' having projection 90 thereon to shaft 80 and the providing of a hole 60' through base 36 through which projection 90 can pass longitudinally into and out of contact with activating member 66. As can be seen, with either approach, the support member is disposed in the same effective position when active.

FIG. 4 (in the form of ghosted rod 90') also discloses a modified form of the present invention particularly adapted for use when shaft 80 and locking member 82, or the like, are not disposed sufficiently close adjacent activating member 66 for the use of a rotatable member 62' directly attached thereto alone. In such case, projection 90 can take the form of being the top end of a longitudinally rigid rod 90' extending from the location of the locking mechanism in operable attachment thereto to be longitudinally moved into and out of contact with the periphery of member 66 by the movement of the locking mechanism as it locks and unlocks the door. It should be apparent that a longitudinally activated member such as ghosted rod 90' of FIG. 4 could also be utilized in the embodiments of FIG. 1 and FIG. 2 by providing a surface on the top thereof (e.g. flat or concave) adapted to contact support member 58 (or 58') and thus provide the support surface of second fulcrum point 64. In any such remote activation, rod 90' could be bent as necessary to pass around obstructions and be positionally guided for proper longitudinal movement by appropriate guides (not shown).

Wherefore, it can be seen from the foregoing exemplary embodiments as applied to different configurations of inertially operated safety belt retractors that the present invention provides a compact, inexpensive, and rapid acting apparatus to be employed in preventing the undesired locking up of the retractor as a result of the forces imposed thereon during opening of the car door while maintaining the ability thereof to react and lock the retractor as the result of emergency imposed forces even during such inhibited operation.

Wherefore, having thus described my invention, I claim:

1. In an inertially operated safety belt retractor adapted for mounting in a vehicular door which door has a movable locking member for engaging a mating member on the door frame for holding the door in a closed and locked position, the retractor including a spool rotatably journaled in a retractor frame and having an engaging surface for engagement by a pawl to prevent rotation thereof, a safety belt wound on the spool, a movable pawl for engaging the engaging surface of the spool to prevent protraction of the safety belt, and a high inertia mass contacting the pawl and pivoting about a first fulcrum point disposed horizontally from the center of gravity of the mass to move the pawl into engagement with the engaging surface of the spool during periods of high lateral force on the mass such as imposed in emergency conditions, the improvement for resisting the non-emergency engaging of the engaging surface of the spool by the pawl during normal opening of the vehicle door comprising:
  (a) means for sensing that the vehicle door is being opened; and,
  (b) means cooperating with said sensing means for disposing a superceding fulcrum point on which the mass must rotate to move the pawl into engagement with the engaging surface of the spool at a greater horizontal radial distance from the center of gravity of the mass than the first fulcrum while the door is being opened.

2. The improvement to safety belt retractors of claim 1 wherein:
  said sensing means is operably connected to the movable locking member of the door whereby said superceding fulcrum point is actively disposed to inhibit, but not prevent, the pivoting of the high inertia mass whenever the door is unlocked.

3. The improvement to safety belt retractors of claim 1 wherein:
  (a) the first fulcrum point is a circular ridge concentrically disposed about the center of gravity of the mass whereby the force required to pivot the mass to engage the pawl is equal in all horizontal radial directions; and,
  (b) the superceding fulcrum point is disposed to supercede said first fulcrum point only at one point on a circle concentric with said circular ridge and of greater radius whereby pivoting of the mass is inhibited in only one horizontal radial direction.

4. In an inertially operated safety belt retractor including a spool rotatably journaled in a retractor frame and having an engaging surface for engagement by a pawl to prevent rotation thereof, a safety belt wound the spool, a movable pawl for engaging the engaging surface of the spool to prevent protraction of the safety belt, an activating member supported for rotating on a first supporting boundary on a base carried by the retractor frame and adapted to move the pawl into engagement with the engaging surface of the spool when rotated, and a high inertia mass carried by said activating member for holding said activating member on said base and for rotating said activating member only in response to a lateral force exceeding a preselected level, the improvement for raising the lateral force in a particular radial direction required to rotate the activating member comprising:

a support member disposed to support the activating member for rotation at a point beyond the first supporting boundary on a radial line extending through the center of gravity of the mass and the point on the first supporting boundary on which the activating member would normally rotate in response to the application of such force.

5. The improvement to safety belt retractors of claim 4 and additionally comprising:

means for selectably supporting the activating member with said support member.

6. The improvement to safety belt retractors of claim 5 wherein:

(a) the retractor is mounted on the door of a vehicle;
(b) said support member is disposed on a radial line normal to the door extending into the vehicle; and,
(c) said selectable support means includes means for supporting the activating member with said support member only when the door is not closed whereby locking of the spool to prevent protraction of the safety belt is impeded during opening of the car door.

7. The improvement to safety belt retractors of claim 5 wherein:

(a) said support member is rigidly connected to move in combination with the activating member and mass;
(b) the base contains a passageway through which said support member can move whereby said activating member is free to rotate about its first support boundary; and,
(c) said means for selectively supporting the activating member with said support member comprises means for blocking said passageway whereby said activating member must rotate about said support member when rotating in the radial direction thereof.

8. The improvement to safety belt retractors of claim 7 wherein:

(a) the retractor is mounted on the door of a vehicle;
(b) said support member is disposed to inhibit rotating of the activating member from forces imposed thereon by the opening of said door but not prevent rotating thereof from forces imposed thereon in an emergency condition; and,
(c) said blocking means is operably connected to unblock said passageway when said door is in a closed state and block said passageway as said door is being opened whereby said retractor will resist locking in response to forces imposed by opening said door.

9. The improvement to safety belt retractors of claim 8 wherein:

said blocking means is operably connected to the locking mechanism of said door to be operated in combination therewith.

10. The improvement to safety belt retractors of claim 5 wherein:

(a) the base contains a passageway disposed adjacent the periphery of said activating member; and,
(b) said support member is disposed to move through said passageway between a first position removed from said activating member whereby said activating member is free to rotate about its first supporting boundary and a second position contacting said activating member whereby said activating member must rotate about said support member when rotating in the radial direction thereof.

11. The improvement to safety belt retractors of claim 10 wherein:

(a) the retractor is mounted on the door of a vehicle;
(b) said support member is disposed to inhibit rotating of the actuating member from forces imposed thereon by the opening of said door but not prevent rotating thereof from forces imposed thereon in an emergency condition; and,
(c) said support member is operably connected to assume said first position when said door is in a closed state and assume said second position as said door is being opened whereby said retractor will resist locking in response to forces imposed by opening said door.

12. The improvement to safety belt retractors of claim 11 wherein:

said support member is operably connected to the locking mechanism of said door to be operated in combination therewith.

* * * * *